Figures 1, 2:
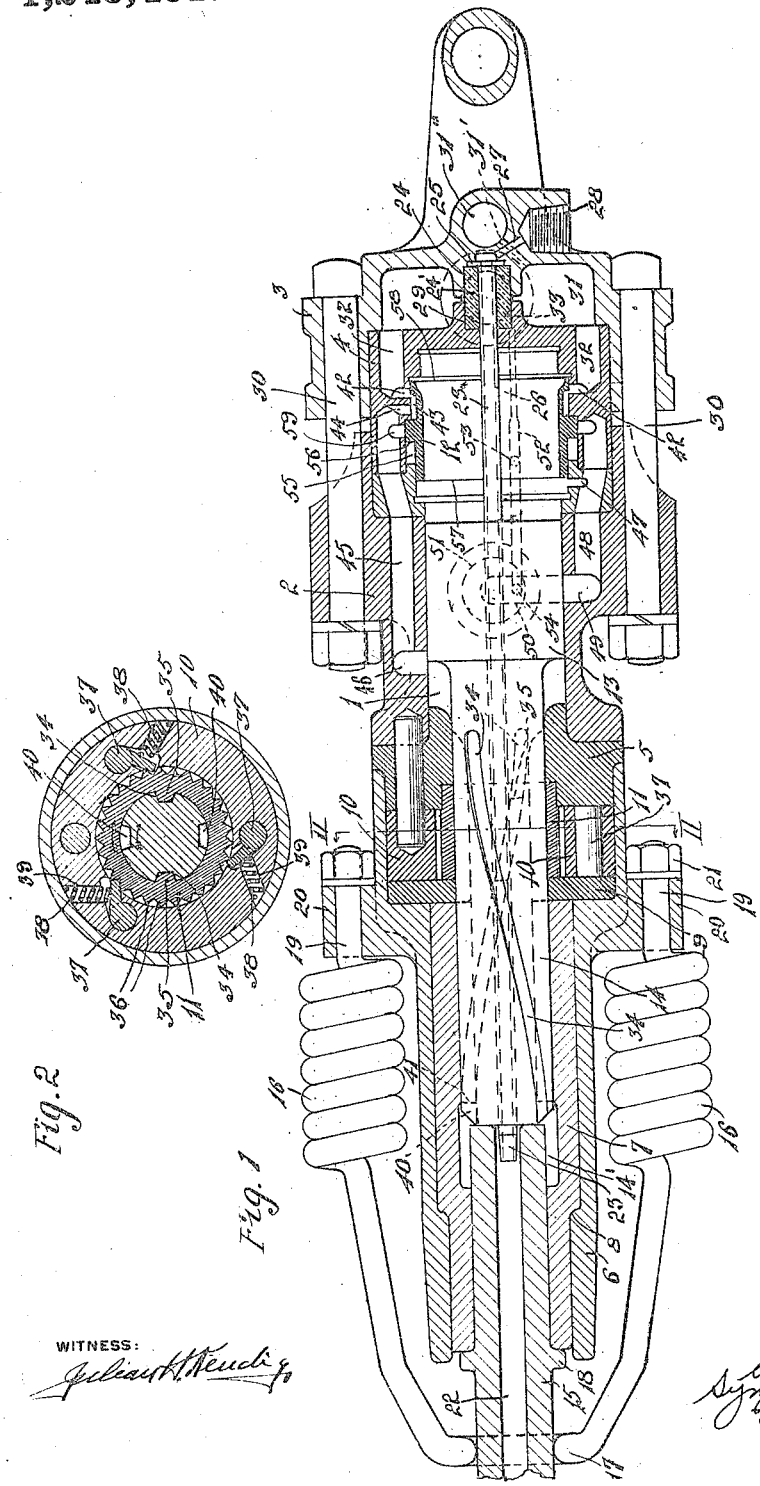

L. W. GREVE.
FLUID OPERATED DRILL.
APPLICATION FILED AUG. 9, 1916.

1,248,481. Patented Dec. 4, 1917.

WITNESS:

INVENTOR.
L. W. Greve
ATTORNEYS.

UNITED STATES PATENT OFFICE.

LOUIS W. GREVE, OF CLEVELAND, OHIO, ASSIGNOR, BY MESNE ASSIGNMENTS, TO THE CLEVELAND ROCK DRILL COMPANY, A CORPORATION OF OHIO.

FLUID-OPERATED DRILL.

1,248,481. Specification of Letters Patent. Patented Dec. 4, 1917.

Application filed August 9, 1916. Serial No. 113,853.

*To all whom it may concern:*

Be it known that I, LOUIS W. GREVE, a citizen of the United States, residing at Cleveland, in the county of Cuyahoga and State of Ohio, have invented certain new and useful Improvements in Fluid-Operated Drills, of which the following is a specification.

This invention relates to fluid operated drills, and particularly to pneumatically operated drills wherein the drill steel is operated by impact of a pneumatically driven piston, and has for its principal objects, the provision of a drilling machine wherein the drill is rotated by the operation of the piston, the provision of a drilling machine wherein the piston rotating means is located in advance of the rear end of the piston; the provision of a rotary piston that is constructed so that the leakage around the piston is reduced to a minimum thereby resulting in more perfect action of the valve; the provision of a means for supplying fluid to the drill end wherein the construction is simple and effective; the provision of a drilling machine that is simple, effective, inexpensive and easily assembled, and such other objects as may hereinafter appear.

In machines wherein the piston is rotated by helical rifling at the rear end of the piston it has been found that there is considerable leakage between the rifling grooves and the rifle nut resulting in a sluggish action of the valve. To overcome this defect the rifling of the cylinder is located in advance of the rear pressure face of the piston so that an air-tight fit may be obtained between the piston and the cylinder walls. Because there is no leakage the valve works quickly and there is more "snap" to the entire operation of the machine.

In machines wherein fluid is supplied to the drill with a tube extending from the rear of the machine to the drill, considerable difficulty has been experienced in securing an effective inexpensive connection between the tube and the parts through which the tube must pass in leading to the drill, and to overcome this difficulty a rubber packing is placed on the tube between the end of the cylinder and the fluid supply head or handle head in such manner that it will be compressed both longitudinally and laterally thereby insuring a simple inexpensive joint that will not leak and may be readily assembled. One embodiment of the invention is illustrated in the accompanying drawings, wherein—

Figure 1 is a longitudinal section through the drilling machine, and Fig. 2 is a transverse section on the line II—II of Fig. 1.

The machine comprises a sectional cylinder 1, which is built of a plurality of sections secured together by bolts or other suitable means. These sections are the main cylinder body 2, the handle or fluid supply head 3 between which is clamped the valve block 4; at the other side of the cylinder body 2 is secured the buffing block 5 and the chuck casing 6. Within the chuck casing 6 is mounted for rotation, a chuck 7. The chuck is held against longitudinal movement within the casing by the shoulder 8 engaging the reduced neck of the chuck casing, and the buffing plate 9 secured in the enlarged bore of the chuck casing. Between the buffing plate 9 and the buffing block 5 is a ratchet cage 10, Figs. 1 and 2, in which is mounted for rotation the rifle nut 11, to be hereinafter described.

Between the valve block 4 and the cylinder body 2 an auxiliary block is placed so that the auxiliary block and the valve block form a cylindrical recess in which a sleeve valve 12 may reciprocate longitudinally of the cylinder a limited distance. The interior diameter of the valve is the same as the diameter of the main cylinder and comprises a continuation of the main cylinder through which the hammer piston may operate.

The hammer piston is provided with a reduced extension 14 which extends forward through the buffing block 5, rifle nut 11, buffing plate 9, into the hollowed portion 14' of the chuck 7 and is adapted to impinge upon the rear end of the drill steel 15. The rear end of the drill steel is preferably hexagonal and fits into a similarly shaped opening in the front end of the chuck and the forward movement thereof is limited by the flexible retaining yoke 16. This yoke consists of a spring steel wire, bent to form a socket at 17 which partially surrounds the drill steel and engages the collar 18 of the drill steel. The ends of the yoke are formed into helical springs and terminate in straight ends 19 which pass through perforations in the extensions 20 of the chuck casing 6. Nuts 21 are screwed upon the ends of the yoke and secure the yoke against longitudinal movement. The free end of the yoke may be sprung away from the drill to permit of its removal when desired.

The drill steel is provided with a central passage 22 which extends from the rear end of the drill to a point adjacent the point thereof, and a tube 23 extending longitudinally of the cylinder projects into the passage 22 of the drill steel. The tube 23 extends rearward through the end of the valve block and terminates in a recess 24 in the supply head or handle 3. The rear end of the tube 23 is provided with a flange 25 which abuts the bottom of the recess 24, and the passage 26 of the tube communicates with the passage 27 in the supply head. A water tube or pipe (not shown) is screwed into the socket 28 and supplies water to the tube 23 which is conducted to the passage 22 in the drill steel. The piston 13 is provided with a central bore through which the tube passes, this bore being of sufficient size to permit of free movement of the piston, but is made so that no air may escape between the tube and the piston.

The valve block is provided with a socket 29 opposite the socket 24 in the head 3, and a packing 24' made of rubber or any suitable material surrounds the tube 23 and is incased in the sockets 24 and 29. When the handle head 3 is drawn up tight against the valve block 4 by the bolts 30, the packing will be compressed against the tube and also against the bottom of the sockets, thereby closing all communication between the interior of the cylinder and the fluid chamber 31, between the fluid chamber 31 and the interior of the tube 23, and between the fluid chamber 31 and the passage 27. It will be seen that one packing element prevents any leakage about the tube without the use of threaded bushings usually required; therefore the construction is simple, inexpensive and easily assembled.

The fluid chamber 31 is provided between the handle head 3 and the valve block 4, to serve as a storage reservoir for air immediately adjacent the supply ports 32 leading directly to the valve 12. It has been found that the operation of the machine is improved by having such reservoir because a uniform supply of air is constantly delivered to the valve and piston. Air is supplied to the fluid chamber from a hose through the port 33 shown in dotted lines.

Referring to Figs. 1 and 2, the piston rotating mechanism consists of a rifle nut 11 surrounding the reduced extension 14 of the piston. The piston extension 14 is rifled with a pair of helically disposed grooves 34 into which project a pair of similarly shaped ridges 35 carried by the rifle nut. Therefore, if the rifle nut is held against rotation the piston will be rotated when it moves longitudinally within the cylinder by the coöperation of the ridges 35 and the slots 34. If the rifle nut is not held against rotation, the piston will move longitudinally of the cylinder without turning and will rotate the rifle nut.

In the operation of the machine it is preferable that the drill be rotated only upon the return stroke of the piston, so that the piston will be free to deliver a maximum blow to the tool on its working stroke. To accomplish this operation, the rifle nut 11 is provided upon its outer surface with a series of teeth 36 adapted to be engaged by a plurality of pawls 37 pivoted within the ratchet cage 10. The pawls are held in engagement with the teeth 36 by means of helical springs 38 disposed in the recesses 39 bored in the ratchet cage. The pawls are arranged so that they are all in different relation with the teeth, so that there will always be one in position to prevent reverse movement of the rifle nut. Therefore, the rifle nut can only be rotated in the direction indicated by the arrow. When the piston moves forward toward the tool, the rifle grooves will cause the rifle nut to rotate in the direction of the arrow and when the piston moves rearward the pawls 37 will prevent rotation of the rifle nut, and the piston will be rotated in the direction of the arrow.

The buffing block 5 and the ratchet cage 10 are held against relative movement by a dowel pin 37' which extends through the buffing block and projects at one end into a recess in the ratchet cage, and projects at the other end into a recess in the cylinder body.

The extension 14 of the piston is also provided with a pair of straight grooves 40 arranged parallel with the axis of the piston. The chuck 7 is provided with a pair of similarly shaped ridges 41, Fig. 1, which extend into the grooves 40 and prevent relative rotary motion between the piston and the chuck. Therefore, when the piston is rotated by the action of the rifle nut the chuck will rotate with it and it will in turn rotate the drill steel 15.

Because the valve 12, as will hereinafter be explained, is shifted entirely by pressure in the cylinder at the rear of the piston, it is necessary that this pressure is not reduced by leakage of air from the cylinder at the time the valve is to be shifted. For this reason the rifling or piston rotating mechanism is placed in advance of the rear pressure face of the piston so that no air can leak from behind the rear face of the piston through the rifling slots. It has been found that, where air can escape from the rear face of the piston through rifling slots that communicate with the cylinder to the rear of the rear pressure face of the piston, the operation of the valve is sluggish. It has not been found practicable to prevent leakage of air through the rifling slots; therefore, the slots are arranged so that they communicate only with the cylinder in advance of the forward pressure face of the piston where the leakage does a minimum of harm. Leakage from the rear face of the piston also disminishes the force of the blow of the piston.

Assuming the piston and valve to be in the position illustrated wherein the valve 12 has just been shifted to rear position and the piston is traveling rearward, the operation is as follows: Air is flowing from the air hose into the fluid chamber 31 through the port 33. Air is now flowing to the front face of the piston from the fluid chamber through ports 32, ports 42 in valve block, around annular groove 43 on valve surface, ports 44, (one shown), passage 45 and port 46. Air is exhausting through port 47, passage 48, port 49, passage 50, outlet 51 to atmosphere.

The valve is being held in its rear position shown by air pressure from the fluid chamber 31 supplied through the passage 52 which communicates with the fluid chamber and has two ports 53 and 54 leading into the cylinder 1. Port 54 is now covered by the piston and air is discharging into the annular space 55 through the port 53 and the pressure against the pressure face 56 on the valve is holding the valve in its rear position.

When the rear end of the piston passes the front end 57 of the valve, all exhaust to the rear of the piston is shut off and the compression resulting acts on the rear face 58 of the valve, which is greater in area than the pressure surface 56, and moves it forward against the pressure on the pressure area 56. When the valve is in its forward position, air passes to the rear face of the piston through ports 32, ports 42 past the rear face of the valve to the rear face of the piston. At such time the air in advance of the piston is exhausting through port 46, passage 45, annular groove 59 in the valve block, passage 48, port 49, passage 50 and exhaust port 51. When the forward end of the piston covers the port 54 the pressure in the passage 52 and on the pressure area 56 will rise so that the pressure on the pressure area 56 combined with the pressure on the front face 57 will overcome the pressure upon the rear face 58 and move the valve rearward to the position shown. The piston will then be forced rearward from air supplied through port 46. It will be seen that while compresed air is supplied to the fluid chamber the piston will continue to reciprocate within the cylinder and operate the drill in the manner previously described.

Water is preferably supplied to the inlet 28 and is conducted to the nose of the drill by the tube 23. Air which leaks past the extension 14 of the piston mixes with the water at the rear end of the drill and the mixture is discharged at the nose of the drill, thereby facilitating the cutting action and at the same time serving to clean the hole. The machine is lubricated with oil supplied to the fluid chamber 31 through a small port 31' leading to a reservoir 31" located behind the fluid chamber. The oil mixes with the air in passing through passages 32 and is conducted to all moving parts of the machine by the air.

Many changes may be made in the details of the construction without departing from the spirit of the invention and the invention is not limited to the specific construction herein illustrated and described.

What I claim is:

1. In combination in a fluid operated drill, a cylinder, a reciprocating piston within the cylinder, a controlling valve for the piston arranged at the rear end of the cylinder, a valve block in which the valve operates secured to the cylinder, a fluid supply head arranged to the rear of the valve block and secured thereto with a fluid chamber therebetween, a perforate drill operated by the piston, a tube extending from a fluid passage in the head through the fluid chamber to the perforation in the drill and a packing means clamped between the valve block and the head adapted to be compressed about the tube by the head and valve block to close all communication between the fluid chamber and the interior of the tube.

2. The combination with a fluid operated drilling machine having a valve block closing the rear end of the cylinder through which block extends a tube for supplying fluid to the drill, and a fluid supply head into which the tube extends and communicates with the supply passage thereof adapted to be clamped to the valve block and provided with a fluid chamber between the valve block and head, of a packing clamped within the fluid chamber between the head and the valve block adapted to be clamped thereby around the rear portion of the tube whereby communication is closed between the cylinder and the fluid chamber, and between the fluid chamber and the interior of the tube and between the fluid chamber and the fluid supply passage in the head.

3. The combination with a fluid operated drilling machine having a valve block closing the rear end of a piston cylinder and a fluid supply head clamped to the block with a fluid chamber therebetween and provided with a tube for supplying fluid to the drill, extending from a passage in the supply head through the fluid chamber and the valve block, of a packing surrounding the tube within the fluid chamber and clamped between the valve block and the head whereby communication is closed between the cylinder and the fluid chamber, between the fluid chamber and the interior of the tube and between the fluid chamber and the supply passage in the head.

4. In combination in a fluid operated drilling machine, a cylinder having the rear end closed, a drill, a piston for operating the drill, a fluid supply head adapted to supply fluid for operating the piston adapted to be clamped to the cylinder and provide a fluid chamber between the cylinder end and the head, a tube for supplying fluid to the drill having its rear end in communication with a fluid supply passage in the head and extending through the fluid chamber and a hole in the rear end of the cylinder, and a packing surrounding the tube clamped between the cylinder end and the head whereby communication is closed between the cylinder and the fluid chamber, between the fluid chamber and the interior of the tube and between the fluid chamber and the fluid supply passage in the head.

LOUIS W. GREVE.